US008219474B2

(12) United States Patent
Sutton et al.

(10) Patent No.: US 8,219,474 B2
(45) Date of Patent: *Jul. 10, 2012

(54) METHOD AND SYSTEM FOR DISTRIBUTING AND ACTIVATING A NON-PERSONALIZED PURCHASE CARD

(75) Inventors: David B. Sutton, Monroe, MI (US); Douglas B Blasiman, Bowling Green, OH (US)

(73) Assignee: Privacash, Inc., Monroe, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/757,329

(22) Filed: Apr. 9, 2010

(65) Prior Publication Data

US 2011/0055082 A1  Mar. 3, 2011

Related U.S. Application Data

(60) Continuation of application No. 10/851,927, filed on May 21, 2004, now abandoned, which is a division of application No. 09/363,499, filed on Jul. 29, 1999, now abandoned.

(51) Int. Cl.
*G06Q 40/00* (2012.01)
(52) U.S. Cl. ........................... 705/35; 705/74
(58) Field of Classification Search .................. 705/35, 705/39–41, 64–68, 74–79; 902/22, 25
See application file for complete search history.

(56) References Cited

U.S. PATENT DOCUMENTS

| 5,388,148 A | 2/1995 | Seiderman |
| 5,420,926 A | 5/1995 | Low et al. |
| 5,477,038 A | 12/1995 | Levine et al. |
| 5,511,121 A | 4/1996 | Yacobi |
| 5,621,787 A | 4/1997 | McKoy et al. |

(Continued)

FOREIGN PATENT DOCUMENTS

EP  0921487 A2  6/1999

(Continued)

OTHER PUBLICATIONS

1st USA Going to Dogs—with Kennel Club Visa (The American Kennel Club is offering a Visa affinity card via First USA Bank) American Banker, v CLXI, n 52, p. 16 Mar. 18, 1996, Journal ISSN: 0002-7561 (United States)—1 page.

(Continued)

*Primary Examiner* — Mary Cheung
(74) *Attorney, Agent, or Firm* — Brooks Kushman P.C.

(57) ABSTRACT

The system includes a first and second computer systems and a purchase card associated with a major credit card organization. The card does not include information about any prospective card holder and is provided with a card number so that when activated, has an initial monetary value. The first computer system, located at a purchase outlet, is configured to transmit the card number over a communication network to the second computer system to activate the account, without requiring information from any person acquiring the card. The activated card is usable at retail establishments that accept credit cards. A method includes the steps of authorizing distribution of a plurality of non-activated purchase cards to purchase card outlets and authorizing activation of the purchase card account without requiring information from any person acquiring the card. Another method includes the steps of receiving a plurality of non-activated purchase cards at a purchase card outlet, and selling the purchase cards without acquiring information about the purchaser and initiating activation of the purchase card sold.

36 Claims, 5 Drawing Sheets

U.S. PATENT DOCUMENTS

| | | | |
|---|---|---|---|
| 5,663,546 A | 9/1997 | Cucinotta et al. | |
| 5,732,136 A | 3/1998 | Murphree et al. | |
| 5,777,305 A | 7/1998 | Smith et al. | |
| 5,794,207 A | 8/1998 | Walker et al. | |
| 5,819,234 A | 10/1998 | Slavin et al. | |
| 5,856,695 A | 1/1999 | Ito et al. | |
| 5,883,810 A | 3/1999 | Franklin et al. | |
| 5,884,272 A | 3/1999 | Walker et al. | |
| 5,903,633 A | 5/1999 | Lorsch | |
| 5,903,880 A | 5/1999 | Bittar | |
| 5,915,007 A | 6/1999 | Klapka | |
| 5,956,695 A | 9/1999 | Carrithers et al. | |
| 5,984,180 A | 11/1999 | Albrecht | |
| 5,991,413 A | 11/1999 | Arditti et al. | |
| 5,991,748 A | 11/1999 | Taskett | |
| 6,000,608 A | 12/1999 | Dorf | |
| 6,006,205 A | 12/1999 | Loeb et al. | |
| 6,006,988 A | 12/1999 | Behrmann et al. | |
| 6,014,646 A | 1/2000 | Sono et al. | |
| 6,076,731 A | 6/2000 | Terrell | |
| 6,105,009 A | 8/2000 | Cuervo | |
| 6,145,741 A | 11/2000 | Wisdom et al. | |
| 6,185,545 B1 | 2/2001 | Resnick et al. | |
| 6,188,994 B1 | 2/2001 | Egendorf | |
| 6,189,787 B1 | 2/2001 | Dorf | |
| 6,226,364 B1 | 5/2001 | O'Neil | |
| 6,246,755 B1 | 6/2001 | Walker et al. | |
| 6,270,012 B1 | 8/2001 | Dawson | |
| 6,282,522 B1 | 8/2001 | Davis et al. | |
| 6,298,336 B1 | 10/2001 | Davis et al. | |
| 6,341,273 B1 | 1/2002 | Briscoe | |
| 6,345,766 B1 | 2/2002 | Taskett et al. | |
| 6,405,182 B1 | 6/2002 | Cuervo | |
| 6,467,684 B2 | 10/2002 | Fite et al. | |
| 6,473,500 B1 | 10/2002 | Risafi et al. | |
| 6,502,745 B1 | 1/2003 | Stimson et al. | |
| 6,615,189 B1 | 9/2003 | Phillips et al. | |
| 6,970,852 B1 | 11/2005 | Sendo et al. | |
| 7,054,838 B2 * | 5/2006 | Sutton et al. | 705/35 |
| 7,254,557 B1 | 8/2007 | Gillin et al. | |
| 7,328,181 B2 | 2/2008 | Sutton et al. | |
| 2001/0001321 A1 | 5/2001 | Resnick et al. | |
| 2001/0042784 A1 | 11/2001 | Fite et al. | |
| 2002/0026418 A1 * | 2/2002 | Koppel et al. | 705/41 |
| 2002/0026420 A1 | 2/2002 | DuPhily | |
| 2002/0174016 A1 | 11/2002 | Cuervo | |

FOREIGN PATENT DOCUMENTS

| | | |
|---|---|---|
| WO | 9638801 A1 | 12/1996 |
| WO | 9740616 A1 | 4/1997 |
| WO | 9903057 A1 | 1/1999 |
| WO | 0137228 A1 | 5/2001 |

OTHER PUBLICATIONS

Plastic payment storm prepares to touch down.●. Abcede, Angel NPN: National Petroleum News v89n1 pp. 26-34 J~ ISSN: 0149-5267—8 pages.

(c) 2005 The Gale Group. All rts. reserv. Banks Enter a New Debit Market, and AmEx Has Its Foot in the Door (American Express, although a niche debit player, has entered the prepaid gift cards arena) ,Debit Card News, v 4, n 11, p. 1+ Nov. 30, 1998 Document Type: Newsletter I5SM: 1055-176X.

\* cited by examiner

METHOD AND SYSTEM FOR DISTRIBUTING AND ACTIVATING A NON-PERSONALIZED PURCHASE CARD

CROSS-REFERENCE TO RELATED APPLICATIONS

This application is a continuation of U.S. application Ser. No. 10/851,927 filed May 21, 2004 now abandoned, which, in turn, is a division of U.S. application Ser. No. 09/363,499 filed Jul. 29, 1999, now abandoned.

BACKGROUND OF THE INVENTION

The present invention relates generally to a method for making a purchase over the Internet, and more particularly to a method of transacting an anonymous purchase through the use of intermediary credit account information.

Currently, a consumer wishing to make a purchase over the Internet must utilize their personal credit card. Secured servers utilized by online vendors accept credit cards and provide protection, via various encryption processes, for the interception of credit card information by third party "hackers". However, even if no "hacking" takes place, the vendor ultimately has the consumer's credit card number. Having the credit card number provides a trail back to the consumer's social security number and other private and personal information which the consumer would not normally circulate.

Possession of the credit card number, in effect, gives the vendor the opportunity to circulate information regarding the consumer, including the consumer's history of purchases which may be utilized for mass targeted mailings as well as any other marketing objectives. In addition, by using ones credit card, those purchases made over the Internet that a consumer may otherwise wish to keep confidential appear on the consumer's monthly credit card statement, and thus are available to others having access to the statement. In other words, circulating information relating to the consumer's purchase could prove to be damaging to the consumer. The current mechanism for transacting purchases over the Internet could lead to irreparable harm and embarrassment to one's credit standing as well as one's personal and professional business life. Accordingly, there is a significant need for a means by which a consumer may confidentially make a purchase over the Internet.

Therefore, it is desirable to provide a method of transacting an anonymous purchase through the use of intermediary credit account information. The purchase should be "untraceable" simulating a "cash" transaction which typically occurs in a typical "bricks and mortar" retail setting. This need will continue to grow exponentially as commercial transactions over the Internet continue to grow. Moreover, there is a rapidly growing need for those consumers who do not have access to a credit card to be able to conduct commercial transactions over the Internet. For instance, due to their credit history or age, there are numerous consumers who do not qualify for a credit card account. These types of consumers are fundamentally prohibited from participating in any Internet commerce transaction.

SUMMARY OF THE INVENTION

In accordance with the present invention, a method is provided for transacting an anonymous purchase over the Internet. The method comprises the steps of: (a) acquiring intermediary credit account information from a purchasing intermediary; (b) providing transactional purchase information, including the intermediary credit account information, to a retailer, where the transactional purchase information is provided by the purchaser using a first computing device of a computer-implemented purchasing system; and (c) transacting a purchase between the purchaser and the retailer using the intermediary credit account information, thereby maintaining the anonymity of the purchaser.

For a more complete understanding of the invention, its objects and advantages, refer to the following specification and to the accompanying drawings.

DETAILED DESCRIPTION OF THE PREFERRED EMBODIMENT

Figure 1:
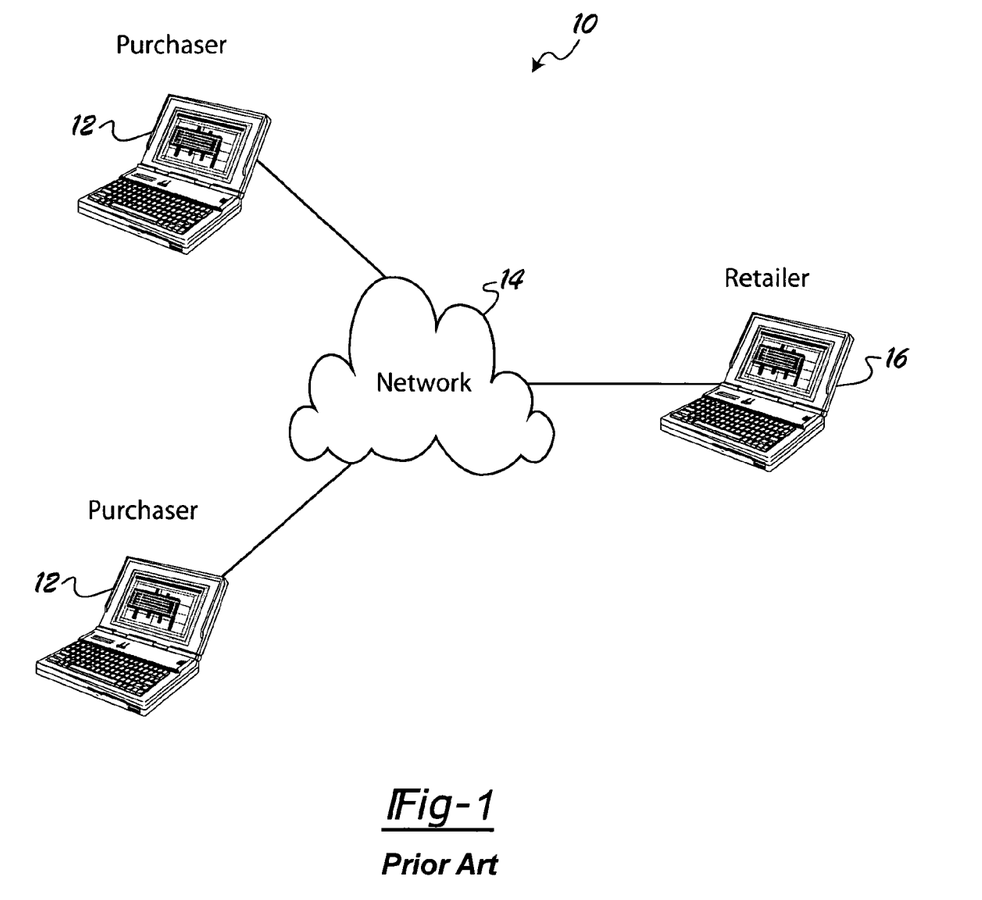
FIG. 1 is a diagram illustrating the basic components of a conventional computer-implemented purchasing system.

FIG. 1 illustrates the basic components of a conventional computer-implemented purchasing system 10. The purchasing system 10 is comprised of a plurality of purchasing computing devices 12 interconnected via a network 14 (e.g., the Internet) to at least one retail computing device 16. As will be apparent to one skilled in the art, the computing devices are able to communicate using common communication protocols (e.g., TCP/IP) over different types of network channels. For illustration purposes, a preferred embodiment of the computing device is a personal computer (PC). Of course, it will be appreciated that the principles of the invention can be employed in a wide variety of computing devices, including but not limited to a telephone, a television or a personal digital assistant (PDA).

Figure 2:
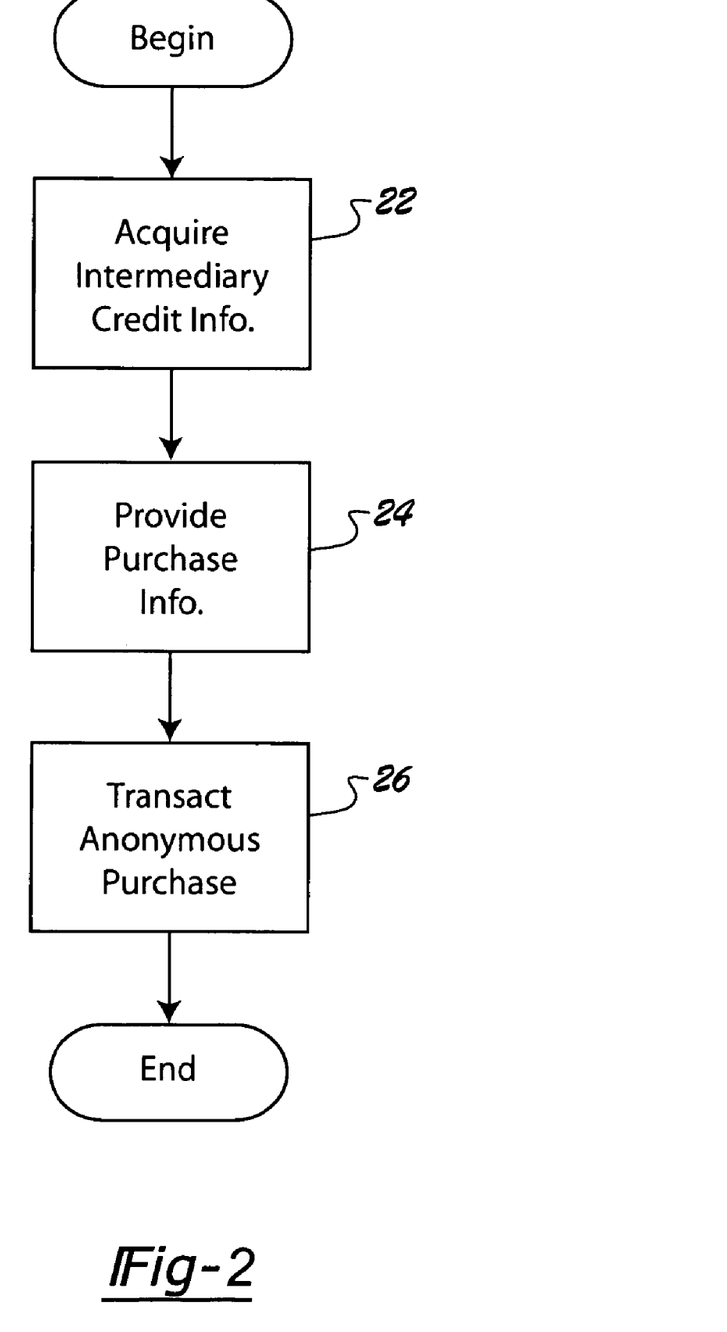
FIG. 2 is a flowchart showing a method for transacting an anonymous purchase in accordance with the present invention.

In accordance with the present invention, an overview of a method for transacting an anonymous purchase using the computer-implemented purchasing system 10 is shown in FIG. 2. First, a purchaser must acquire intermediary credit account information 22 from a purchasing intermediary. Next, the purchaser provides transactional purchase information 24, including the intermediary credit account information, to a retailer, using a purchasing computing device connected to the network 14. Lastly, a purchase is transacted 26 between the purchaser and the retailer through the use of the intermediary credit account information, thereby maintaining the anonymity of the purchaser. While the following description is provided with reference to an intermediary credit account, it is readily understood that an intermediary debit account is within the scope of the present invention.

Figure 3:
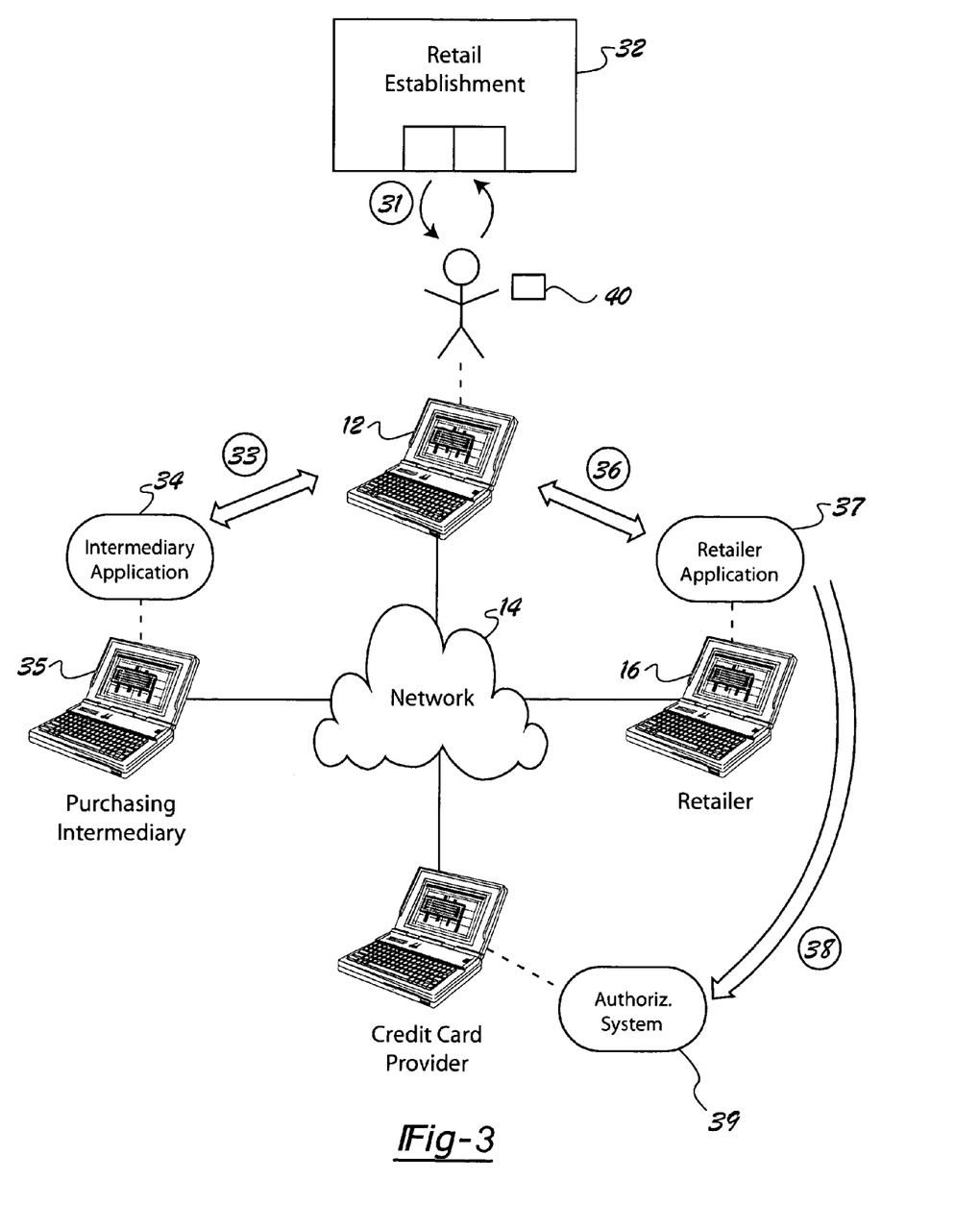
FIG. 3 is a detailed flow diagram of the method for transacting an anonymous purchase in accordance with the present invention.

A more detailed description of the method of the present invention is provided in conjunction with FIG. 3. The method of the present invention operates in a similar fashion to that of a pre-paid phone card. The primary objective of the method is to create a non-traceable means to transact a purchase over the Internet. In order to accomplish this task, there must exist a procedure for converting "real currency" to "Internet currency". In the context of this discussion, "real currency" refers to credit on a credit card or actual currency issued by a national treasury of any country. Therefore, a currency conversion must take place via an intermediary web site over the Internet or in a "bricks and mortar" retailer.

Figure 4A:
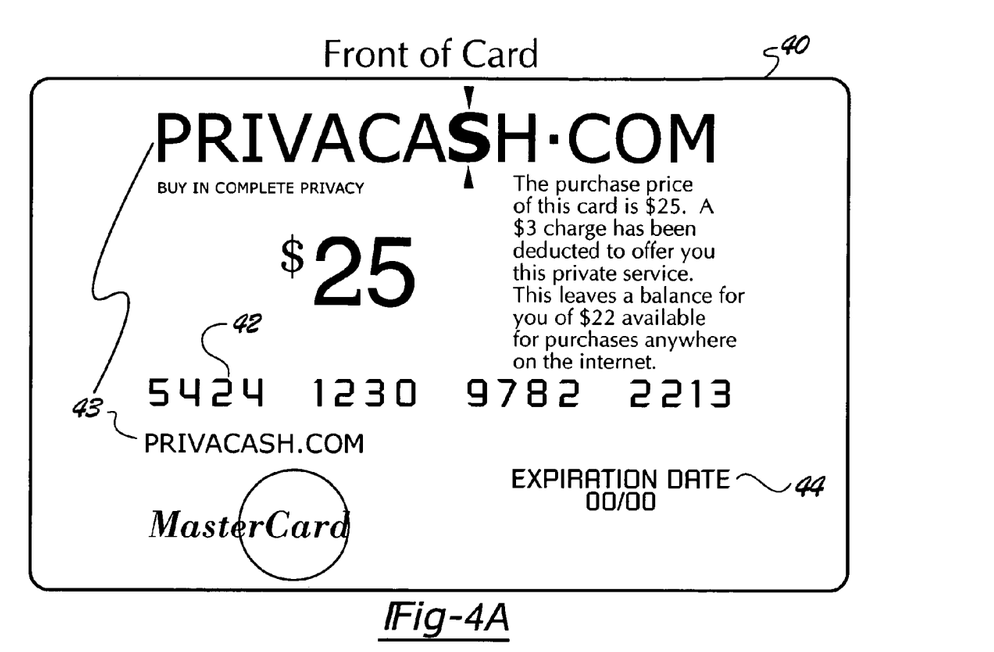
FIGS. 4A and 4B are a front and back view, respectively, of an exemplary pre-paid purchasing card in accordance with the present invention.
Figure 4B:
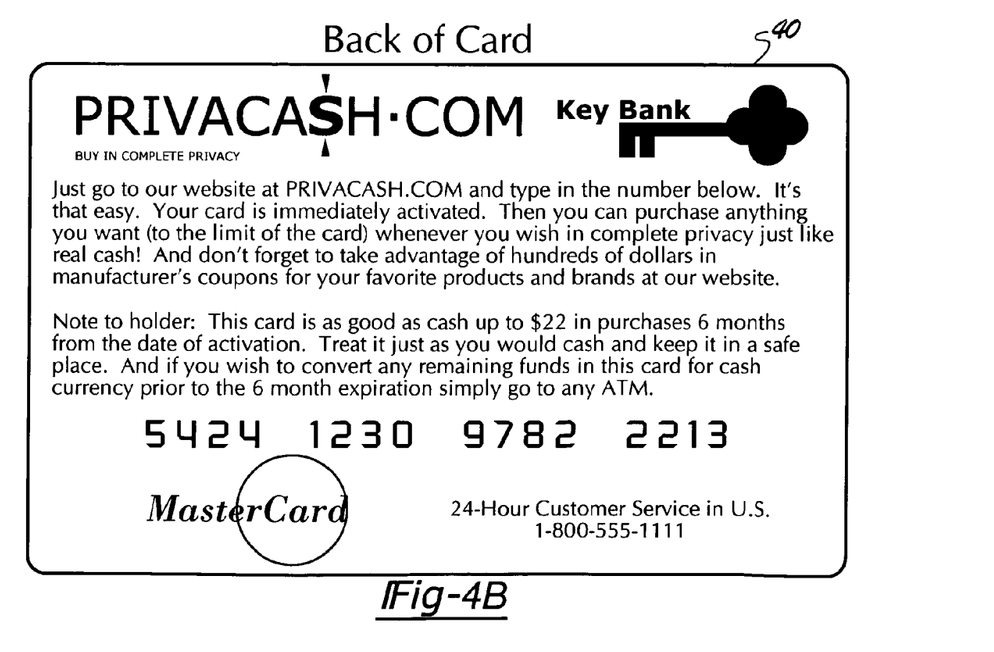

In the case of the "bricks and mortar" retailer, a pre-paid purchasing card is to be offered by the retailer in various predetermined denominations (e.g., $25, $50, or $100). The consumer would visit the retail establishment 32, such as a 7-11 store, a WAL-MART store, or a RITE-AID store, to buy 31 one or more purchasing cards. An exemplary purchasing card 40 is shown in FIGS. 4A and 4B. The purchasing card 40 includes a unique and non-traceable Master Card or Visa credit account number 42, a non-personalized cardholder name 43 (such as the name of the purchasing intermediary) and an expiration date 44 which allows the consumer the ability to make a purchase(s) over the Internet or in other "bricks and mortar" retail establishments. It is envisioned that the card will have a predetermined expiration (e.g., six months) from the date the consumer activates the card. As will be more fully explained below, there is also a credit limit associated with each purchasing card.

Each purchasing card 40 is a non-recourse credit card issued by a credit card provider (e.g., CITIBANK, BANCONE, etc.). The credit card provider sells blocks of purchasing cards to a purchasing intermediary 35. Each purchasing card is sold for a predetermined denomination (e.g., $23, $47 or $97) which corresponds to a credit limit that is associated with the purchasing card 40. The purchasing intermediary 35 in turn sells each purchasing card 40 at a slightly higher cost to a consumer. For instance, a consumer would pay $25 for a purchasing card 40 which has an available credit limit of $22. The $3 difference in cost is a service fee captured by the purchasing intermediary 35. It should also be noted that as additional inducement for providing the actual physical purchasing cards, the credit card provider may receive a fee from the purchasing intermediary for each card which is activated and/or used by a consumer.

The purchasing cards are provided on a consignment basis by the purchasing intermediary 40 to participating retailers 32. Amongst other incentives, the retailer may also receive a fee from the purchasing intermediary for each purchasing card which was purchased at their retail establishment.

The consumer then buys the purchasing card 40 at the retailer establishment 32 either by charging the purchase on the consumer's credit card or through an exchange of actual cash currency. If the consumer elects to buy the purchasing card 40 with a credit card, then consumer's monthly billing statement from the credit card provider simply shows the name of the retailer and the aggregate amount of the purchase. On the other hand, if the consumer elects to buy a purchasing card 40 with cash currency there is no post purchase confirmation process.

In either case, the credit account number on the purchasing card 40 is not part of the transaction, and thus is not linked to the consumer. In other words, each purchasing card 40 is a "bearer card" which means it is as good as cash. Should the consumer lose or misplace the purchasing card 40, it may be used up to the limit available on the card by anyone in possession of the card. In this way, the purchasing card provides a means for preserving the anonymity of the purchaser in future purchases made over the Internet.

Once the consumer buys the purchasing card 40, they then need to activate 33 of their purchasing card 40 by contacting the purchasing intermediary 35. It is envisioned that an intermediary software-implemented application 34 resides on a computing device which is operated by the purchasing intermediary 35. Thus, the intermediary application 34 may be accessed by the consumer via the network 14 using a purchasing computing device 12. More specifically, the intermediary application 34 may be associated with a web site on the Internet, where an address for the web site is provided on the purchasing card 40.

The intermediary application 34 is receptive of the credit account number as entered by the consumer and operative to activate the card. To do so, the intermediary application 34 interfaces with a data store which maintains a record for each purchasing card acquired by the purchasing intermediary. Each record includes the account number, the non-personalized cardholder name, the expiration date, a credit limit, an activation flag and other types of account information as is known in the art.

In order to activate their card, the consumer enters the credit account number shown on the purchasing card into the intermediary application 34. No further information is requested of the consumer. One skilled in the art will readily recognize that to activate the purchasing card 40, the intermediary application 34 may interface with an additional authorization system as provided by the credit card provider. Upon activation, the consumer has a set time from the activation date to exhaust the available funds of their purchasing card 40. While the above description discusses contacting the purchasing intermediary via the network, it is readily understood that other means are available for contacting the purchasing intermediary (e.g., via the telephone), thereby activating the purchasing card 40.

Figure 5:
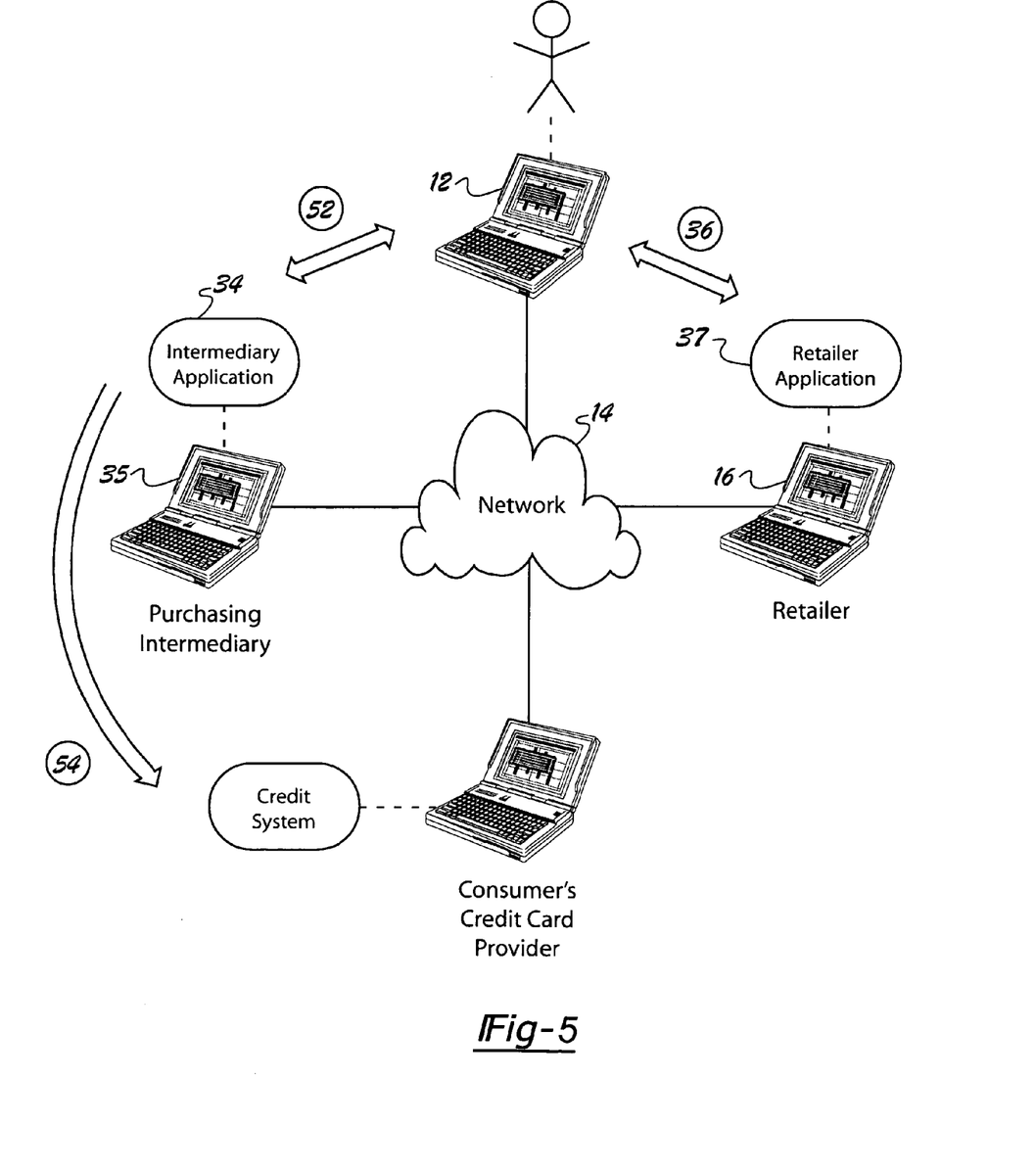
FIG. 5 is a detailed flow diagram of an alternative method for transacting an anonymous purchase in accordance with the present invention.

An alternative means for acquiring intermediary credit account information is described in relation to FIG. 5. Rather than visiting a retail establishment, the consumer may directly access 52 the intermediary application 34 in order to obtain intermediary credit account information. Instead of receiving a purchasing card, the consumer merely acquires the intermediary credit account information over the network 14. In this case, the intermediary application 34 is receptive of credit card information from the consumer and operative to provide intermediary credit account information to the consumer.

As part of this process, the consumer's credit card is debited 54 for the cost (e.g., $25, $50 or $100) associated with acquiring the intermediary credit account information. As previously explained, the intermediary credit account information includes a credit account number, an expiration date, and a credit limit (e.g., $23, $47 or $97) which is slightly less than the cost associated with the service. The consumer's monthly billing statement from the credit card provider will simply show the name of the purchasing intermediary and the aggregate amount of the purchase. Again, the intermediary credit account information is not linked to the consumer, thereby maintaining the anonymity of the purchaser in future Internet transactions.

Once the consumer acquires intermediary credit account information, they are free to use it to make an online purchase over the Internet as shown in either FIG. 3 or FIG. 5. The consumer must first accesses a retailer's software-implemented application 37 in order to transact a purchase 36. It is envisioned that the retailer's application 37 resides on the retailer's computing device 16 which is accessed via the network 14 using a purchasing computing device 12. In particular, the retailer's application 37 may be associated with a web site on the Internet. Furthermore, the retailer's application 37 is receptive of purchase transactional information from the consumer and operative to transact a purchase with the consumer over the network 14.

When the consumer is ready to make a purchase, they are prompted through a series of payment and shipping questions to provide purchase transactional information. As will be apparent to one skilled in the art, the purchase transactional information describes the purchased goods or services as well as provides payment information from the consumer, including the credit account number associated with the intermediary credit account information. The intermediary credit account information further provides at least some pseudo purchase transactional information to the consumer. For instance, each purchasing card may have the same or a different non-personalized cardholder name listed on the card. When the consumer is prompted by the retailer's application 37 to provide a name, they simply insert the cardholder name, for example the name of the purchasing intermediary or an alias such as "John Smith" as provided on the card. The consumer will also be prompted to provide the credit account number and the expiration date associated with the purchasing card. The account number, cardholder name and expiration date are then used by the retailer's application to complete the purchase transaction with the consumer in a manner known in the art. One skilled in the art will readily recognize that as part of transacting the purchase, the retailer's application 37 may verify 38 that the purchase price does not exceed the credit limit associated with the purchasing card. To do so, the retailer's application 37 may interface with an additional authorization system 39 as provided by either the purchasing intermediary or the credit card provider.

Of course, the consumer is free to make other purchases up to the credit limit associated with their intermediary credit account. In the case the purchasing card, the card can be discarded once the funds on the purchasing card are exhausted. In addition, any residual funds remaining on the consumer's purchasing card may be drawn out (e.g., using any ATM facility or bank) prior to the expiration date by the consumer.

In the event that the purchase is for goods which need to be shipped to the consumer, the consumer will also need to provide shipping instructions. The consumer has two options: (1) provide a shipping address (i.e., home or business address) or (2) utilize a forwarding service provided by the purchasing intermediary. It is noteworthy that the consumer's address does not alone generally ensure access to a consumer's credit history and other confidential personal information. Thus, a consumer may opt to provide a shipping address and yet retain anonymity from the retailer.

In the later case, the goods will be shipped to the purchasing intermediary who will then ship the goods to the consumer. To do so, the intermediary credit account information provides an intermediary shipping address which the consumer can provide to the retailer. The consumer's shipping address may be captured by the purchasing intermediary when the consumer is activating their purchasing card, and then, upon receipt of the goods from the retailer, it is used to ship the goods to the consumer. An additional service fee covering at least up to the shipping costs may be charged by the purchasing intermediary to the consumer. It is envisioned that the service fee may be debited to the available funds remaining on the purchasing card.

It is widely known that large retailers spend considerable money to circulate discount coupons to consumers. The present invention offers an alternative distribution channel for these retailers. In particular, the intermediary application 34 may further be operative to provide discount coupons to the consumer. While the consumer is either activating their purchasing card or acquiring intermediary credit account information, the consumer may select from a menu of participating retailers. The consumer would then be directed to a web site or other type of software application where they could check to see if any discount coupons were being offered by the retailer. If so, they could simply print the coupon on a printer attached to their local computing device 12. The consumer may also be asked to answer a short series of non-personal questions in conjunction with obtaining the coupon. The questions are typically designed to determine relevant product user information. By enabling retailers the ability to offer their coupons in conjunction with this service, the purchasing intermediary is then able to charge a service fee to the retailer, thereby deriving another revenue stream.

While the above description constitutes the preferred embodiment of the invention, it will be appreciated that the invention is susceptible to modification, variation, and change without departing from the proper scope or fair meaning of the accompanying claims.

The invention claimed is:

1. A method comprising:
   authorizing a plurality of purchase card outlets to sell unfunded physical purchase cards, each of the purchase cards including a major credit card organization brand and an associated account number, each card for sale not including any information associated with or provided by a prospective cardholder, and when funded, the card being usable to make purchases at retail establishments that accept credit cards of the major credit card organization, including retail establishments not associated with the plurality of purchase card outlets;
   authorizing distribution of the purchase cards to the plurality of purchase card outlets; and
   authorizing funding of a purchase card account associated with one of the purchase cards for a specified amount of money.

2. The method of claim 1 wherein each of the purchase cards has an associated card date beyond which the card may not be used.

3. The method of claim 2 wherein the card date is imprinted on the card.

4. The method of claim 1 or 2 wherein each of the purchase cards has imprinted thereon a predetermined monetary denomination.

5. The method of claim 2 wherein authorizing funding includes authorizing an intermediary to fund the purchase account.

6. The method of claim 1 or 5 wherein the purchase cards are distributed in blocks of cards.

7. The method of claim 1 or 5 wherein authorizing funding of a purchase card account is done using a software-implemented application.

8. The method of claim 1 or 5 wherein authorizing funding of a purchase card account is done by phone.

9. The method of claim 1 or 5 wherein each of the purchase cards, once funded, is usable at online retail establishments and bricks-and-mortar retail establishments.

10. The method of claim 1 or 5 wherein no information associated with any prospective cardholder is collected.

11. The method of claim 1 or 5 wherein the method further comprises the step of authorizing a purchase transaction against the funded card account after the purchase card account number and a monetary purchase amount have been transmitted to verify that the monetary purchase amount does not exceed the account's available balance and without requiring any information from the cardholder.

12. The method of claim 11 wherein the one of the purchase cards has an associated card date beyond which the card may not be used and wherein authorizing a purchase transaction occurs after verifying that the date of the purchase transaction is not beyond the card date.

13. The method of claim 12 wherein the card date is imprinted on the card.

14. The method of claim 12 wherein the purchase cards are distributed in blocks of cards.

15. The method of claim 11 wherein authorizing funding of a purchase card account is done using a software-implemented application.

16. The method of claim 11 wherein each of the purchase cards, once funded, is usable at online retail establishments and bricks-and-mortar retail establishments.

17. A method comprising:
 distributing unfunded physical purchase cards to a plurality of purchase card outlets for sale by the purchase card outlets, each of the purchase cards including a major credit card organization brand and an associated account number, each distributed card not including any information associated with or provided by a prospective cardholder, and when funded, the card being usable to make purchases at retail establishments that accept credit cards of the major credit card organization, including retail establishments not associated with the plurality of purchase card outlets; and
 funding a purchase card account associated with one of the purchase cards for a specified amount of money.

18. The method of claim 1, 3 or 17 wherein the card date is imprinted by embossing.

19. The method of claim 1, 3 or 17 wherein the distributing step is on a consignment basis.

20. The method of claim 1 or 17 wherein the plurality of purchase card outlets includes banks.

21. The method of claim 17 wherein each of the purchase cards has an associated card date beyond which the card may not be used.

22. The method of claim 21 wherein the card date is imprinted on the card.

23. The method of claim 17 or 21 wherein each of the purchase cards has imprinted thereon a predetermined monetary denomination.

24. The method of claim 21 wherein funding a purchase card account includes authorizing an intermediary to fund the purchase account.

25. The method of claim 17 or 24 wherein the purchase cards are distributed in blocks of cards.

26. The method of claim 17 or 24 wherein funding a purchase card account is done using a software-implemented application.

27. The method of claim 17 or 24 wherein funding a purchase card account is done by phone.

28. The method of claim 17 or 24 wherein each of the purchase cards, once funded, is usable at online retail establishments and bricks-and-mortar retail establishments.

29. The method of claim 17 or 24 wherein no information associated with any prospective cardholder is collected.

30. The method of claim 17 or 24 wherein the method further comprises the step of authorizing a purchase transaction against the funded card account after the purchase card account number and a monetary purchase amount have been transmitted to verify that the monetary purchase amount does not exceed the account's available balance.

31. The method of claim 30 wherein the one of the purchase cards has an associated card date beyond which the card may not be used and wherein authorizing a purchase transaction occurs after verifying that the date of the purchase transaction is not beyond the card date.

32. The method of claim 31 wherein the card date is imprinted on the card.

33. The method of claim 31 wherein the purchase cards are distributed in blocks of cards.

34. The method of claim 30 wherein authorizing funding of a purchase card account is done using a software-implemented application.

35. The method of claim 30 wherein each of the purchase cards, once funded, is usable at online retail establishments and bricks-and-mortar retail establishments.

36. The method of claim 1 or 17 wherein the funding a purchase card account is done without requiring the person acquiring the card to provide any personal information.

* * * * *